March 16, 1954 G. McVEY 2,672,379
LINEAR BALL BEARING
Filed Nov. 21, 1950 3 Sheets-Sheet 1
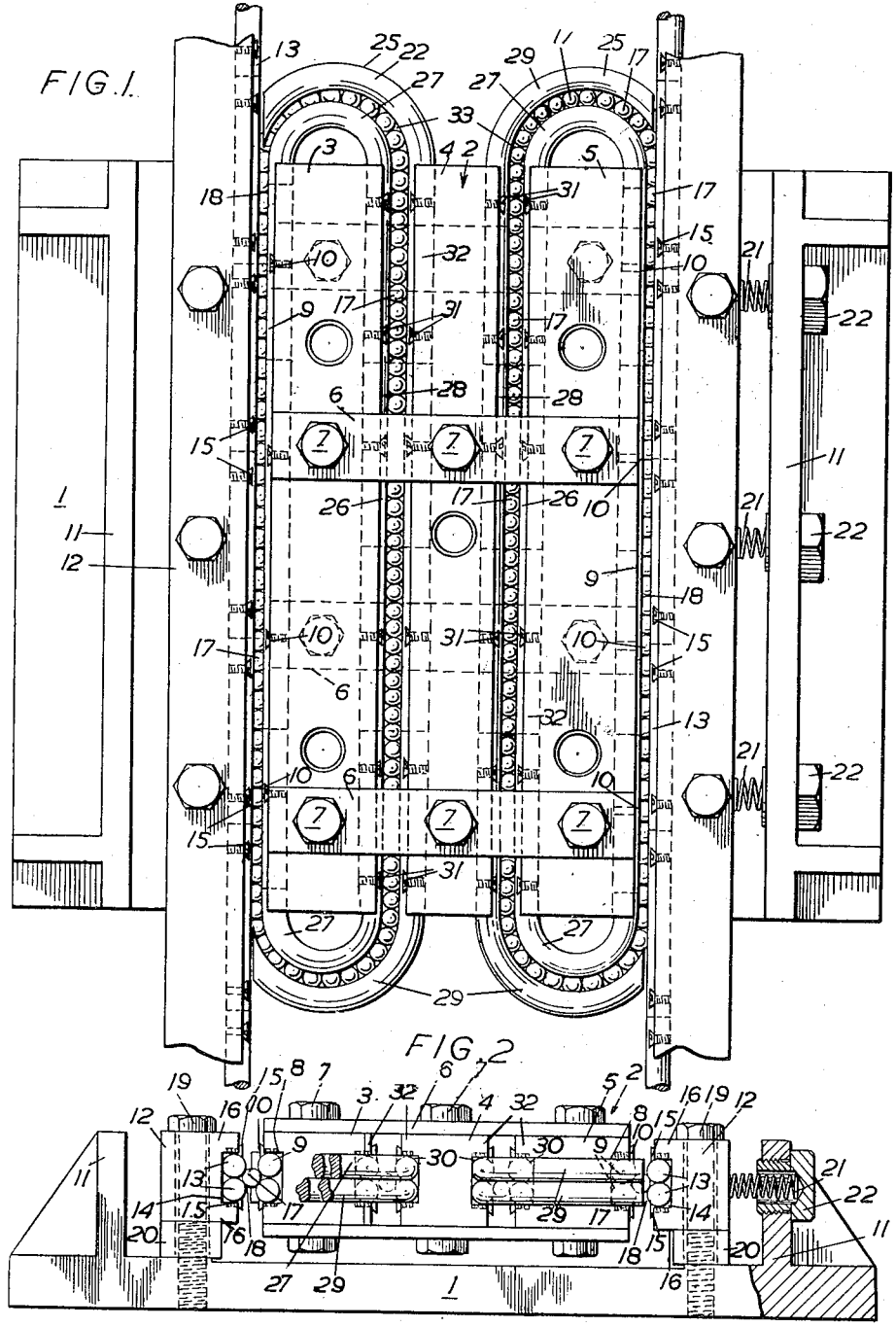
George McVey Inventor
By
Attorney March 16, 1954

G. McVEY 2,672,379

LINEAR BALL BEARING

Filed Nov. 21, 1950

Inventor
George McVey
By
Attorney

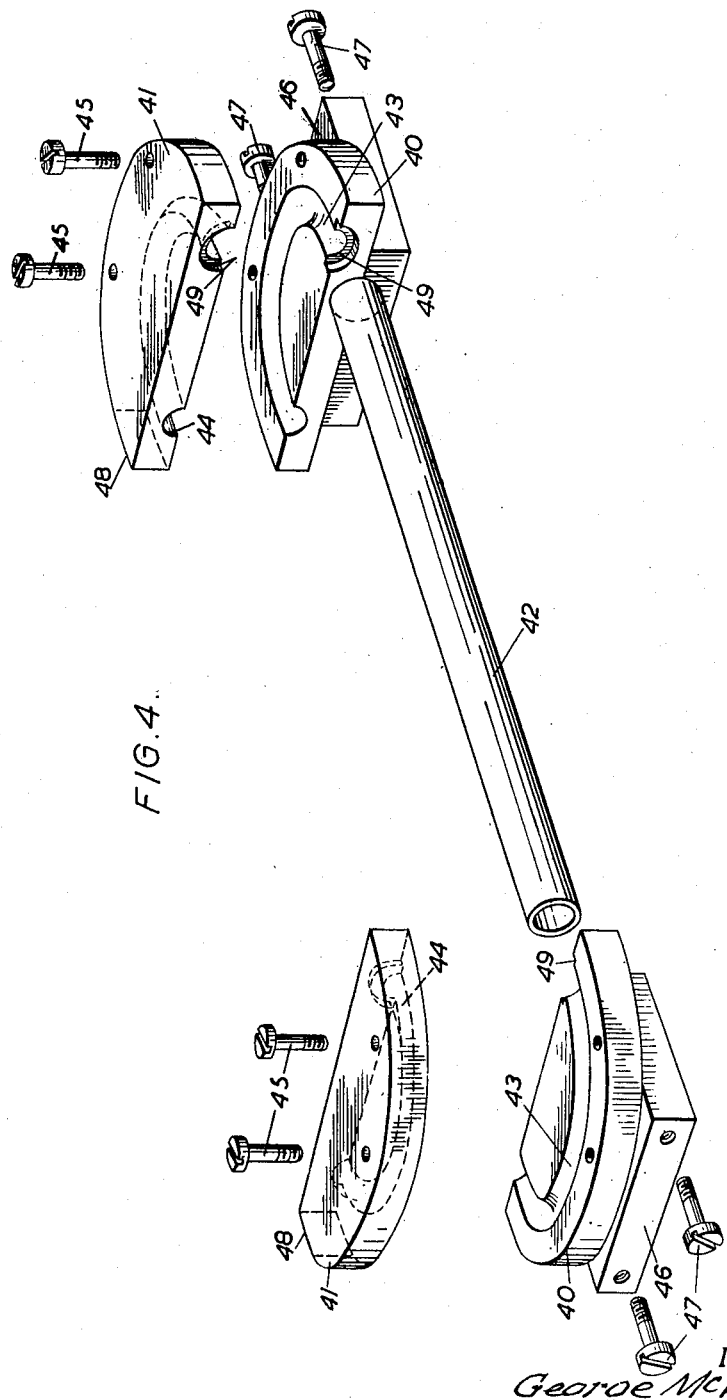

Patented Mar. 16, 1954

2,672,379

UNITED STATES PATENT OFFICE 2,672,379

LINEAR BALL BEARING

George McVey, High Wycombe, England

Application November 21, 1950, Serial No. 196,805

Claims priority, application Great Britain
November 29, 1949

8 Claims. (Cl. 308—6)

This invention has reference to improvements in and relating to rectilinear ball bearings and ball bearing assemblies and one object thereof is the provision of a ball bearing or ball bearing assembly wherein the extent of the travel between the relatively movable members of the bearing or bearing assembly is not limited by the rectilinear dimensions of the inner ball tracks in relation to the length of the row or rows of rectilinearly disposed balls.

A further object of the invention is to improve or modify the bearing assemblies forming the subject of the invention disclosed in co-pending application Serial No. 98,925 whereby the above-mentioned advantage is imparted to the said bearing assemblies in which the ball tracks are formed from rods of circular cross-section.

Typical machines to which the present invention can be applied comprise flame-cutting burner machines having carriages and tracks and wood-working machines having a worktable and track.

The invention resides in an improvement in or modification of a bearing assembly according to the invention disclosed in co-pending application Serial No. 98,925 which consists in using inner and outer pairs of rods of different length in each of the two groups of rods forming a ball track and in extending each row of balls in guideways which are located at the ends of and fixed in relation to the shorter rods to form closed endless ball-circuits therewith which are not subjected to the lateral pressure applied to the track rods.

Since the balls, when in the guideways, are relieved of the bearing load and the lateral pressure which is applied to them when they are in their raceways, a high degree of accuracy is not called for in the parts forming the guideways.

Each guideway may comprise a group of four cylindrical rods arranged with parallel axes and in spaced relation to provide a guideway for the balls and open gaps between the rods, said gaps permitting foreign matter to fall clear of the guideways. Hence, when such guideways are incorporated in a bearing or bearing assembly there is no danger of the balls jamming when travelling along the guideways. Thus, when guideways comprising cylindrical rods are associated with bearing assemblies according to the said co-pending application the self-cleaning effect produced by the use of track rods, more particularly, is not rendered nugatory by the jamming of the balls in the guideways.

The present invention is not limited to guideways formed from rods.

Rectilinear ball bearing assemblies in accordance with the present invention will now be described with reference to the accompanying drawings wherein:

Fig. 1 is a plan view of an assembly wherein the guideways for the balls are provided by rods;

Fig. 2 is an end elevation partly in section of the assembly shown in Fig. 1;

Fig. 4 is an exploded view showing end blocks and tubes for building up another form of guideway which may be used in a bearing or bearing assembly according to the present invention.

Figure 3:
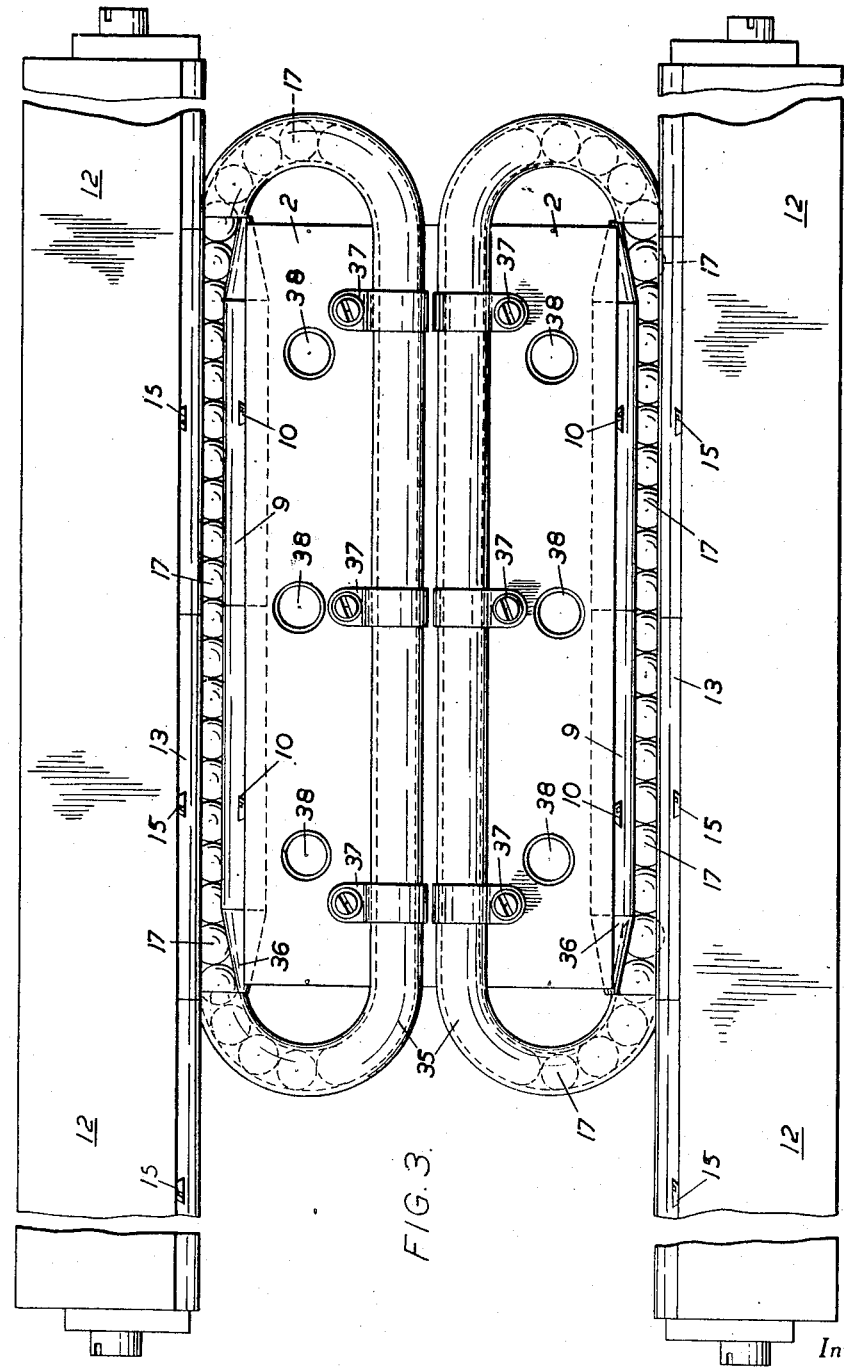
Fig. 3 is a plan view of an assembly wherein the guideways are provided by tubes.

The assembly shown in Figs. 1 and 2 comprises a fixed member 1 for mounting on a machine bed or the like and a movable member 2, adapted to have a worktable or the like bolted to its top.

The movable member 2 comprises three parallel bars 3, 4 and 5 of I section secured together in spaced relation by top and bottom ties 6 and bolts 7. The grooves 8, 8 in the outer sides of the bars 3 and 5 contain cylindrical track rods 9 which are held in place by fixing screws 10 entering the outer flanges of the said bars, said bars 3 and 5 thus providing carriers for the track rods 9; and on the member 1 adjacent to the inner sides of longitudinal flanges 11 thereon are carriers 12 for cylindrical track rods 13, said track rods being located in grooves 14 in the inner sides of the carriers and held in place by fixing screws 15 entering the flanges 16 of the carriers. The rods 9 and the adjacent rods 13 provide tracks for rows of balls 17. Gaps 18 between the associated track rods permit of the free passage of foreign matter through the rows of balls—hence the tendency of the bearing to be clogged by dirt and other foreign matter is very considerably lessened.

The carriers 12 are secured to the member 1 by bolts 19 with the interposition of packing or spacing elements 20. Before the bolts 19 of the carrier 12 adjacent to the righthand flange 11 are tightened lateral pressure is applied to the said carrier by means of springs 21 which are compressed by externally screw-threaded cap nuts 22 entering the said flange 11. The degree of pressure may be predetermined by a suitable choice of springs and by tightening the cap nuts more or less. The compressed springs urge the adjacent carrier 12 towards the member 2 so that the tracks are urged into contact with their respective rows of balls to a degree dependent upon the spring pressure, the magnitude of this pressure being limited by the springs. After the required pressure has been applied by the springs the bolts 19 of the carrier receiving the direct thrust of the springs are tightened. It will be appreciated that the holes in the right-hand carrier 12 through which the bolts 19 pass are larger than the shanks of the bolts to permit of lateral movement of the carrier under the thrust of the springs. The left-hand carrier 12 may be similarly secured and the adjacent flange 11 may be provided with bolts which thrust against the said carrier, thereby enabling the lateral position of the member 2 to be adjusted slightly. Alternatively, a packing bar, not shown, may be located between the left-hand flange and the adjacent carrier or in some cases the carrier may abut the flange.

Apart from differences of structural detail the assembly so far described with reference to Figs. 1 and 2 is in accordance with features disclosed in co-pending application Serial No. 98,925. In such constructions the extent of the relative travel between the members, comparable with the members 1 and 2 herein, is, however, limited by the length of possible travel of the row of balls.

In order to avoid the above-mentioned limitation the member 2 is provided with guideways 25 extending from end to end of the respective track rods and the guideways are filled with bearing balls 17. Hence the track rods 13 may be of any convenient length—it will be observed that they and their carriers are longer than the rods 9— since the balls can, if necessary, continuously circulate through the raceways and guideways, said balls performing their bearing function only when in the raceways.

Each of the two guideways is provided by four runs of cylindrical rods. Two runs of each set of four comprises intermediate rods 26 and J-shaped end rods 27 mounted one above the other in the bars 3 and 5 and the other two runs of each set comprise intermediate rods 28 and J-shaped end rods 29 mounted one above the other in the bar 4. The intermediate rods and the strokes of the J-shaped rods lie in grooves 30 in the opposite sides of the bars 3—4—5 and are held in position by screws 31 entering the flanges 32 in a manner comparable with the way in which the track rods 9 and 13 are secured in their grooves. The ends of the loops of the rods 27 lie in the ends of the grooves 8 in abutting relation to the track rods 9; and the loops of the rods 29 terminate near the track rods 13. The rods forming the guideways thus join the tracks at their ends so that the balls can pass into and out of the tracks whilst the member 2 travels rectilinearly and can, if the length of the rods 13 be sufficient, continuously circulate round the path defined by the tracks and guideway.

The rods 26—27 are spaced from the rods 28—29 so that gaps 33 are provided between them; and the centres of curvature of the looped ends of the rods 29 are slightly further away from the associated tracks than is the centre of curvature of the rods 27 so that the guideways and the gaps widen slightly in a direction away from the associated tracks.

Owing to the provision of the gaps foreign matter is able to pass through the rows of balls when the latter are in the guideway. Hence the bearings are self clearing throughout the whole of the runs of their balls. For this reason the bearings are particularly suitable for use in atmospheres charged with dust, wood chips and other particles.

Owing to the gradual widening of the guideway, previously mentioned, the balls enter and leave the said guideway freely and, therefore, but little added effort is required to urge them along the guideway.

In Fig. 3, which is somewhat diagrammatic, the member 2 is provided with guideways formed by metal tubes 35 the ends of which are bent round so as to abut the ends of the track rods 9 carried by the said member, whilst the openings in the ends of the tubes substantially register with the ends of the respective bearing raceways provided by the said rods and co-operating rods 13. The outer ends of the rods 9 are preferably tapered as shown at 36 to permit of the easy passage of the balls into and out of the tube whilst the member 2 travels rectilinearly, it being understood that each guideway as well as its associated raceway is filled with balls. The bore of the tube is, of course, large enough to permit of the free flow of balls through it. Any suitable means such as the clips 37 fixed to the member 2 may be provided for securing the tubes 35 to the said member. Bolt holes 38 are provided to permit a worktable or the like to be fixed to the member 2.

The track rods lie partially within grooves in their respective carriers and are secured in place by screws 10 and 15. As in the previous example, the carriers 12 are mounted on a fixed support, not shown, comparable with the element 1, said element carrying the pre-loading means preferably comprising compression springs.

The parts shown in Fig. 4 which, when assembled, provide a further form of guideway suitable for use in a bearing or bearing assembly according to the invention comprise two pairs of end blocks 40—41 and a tube 42 adapted to extend from one pair of end blocks to the other. Each block 40 is semi-circularly grooved in its upper face, as indicated at 43 and the blocks 41 are similarly grooved at 44 on their underface, all of the grooves being of semi-circular cross section, so that when the blocks 41 are placed on the respective blocks 40 and secured by screws 45 the grooves in each pair of blocks collectively form passages of circular cross section. The lower blocks 40 are rigid with mounting blocks 46 having holes for the passage of screws 47 whereby the blocks can be mounted on a member such as 2, Fig. 3. Those sides 48 of the blocks which lie adjacent to the longer track rods of the bearing assembly in which the guideway is mounted are in close proximity to the grooves so that the receiving-delivering ends of the grooves can be located at the ends of the row of balls in the bearing raceway. The grooves in the blocks are stepped at 49 so as snugly to accommodate the ends of the tube 42.

When the above described parts are employed the blocks 40 are first fixed to the movable member, then the ends of the tube are inserted in the steps 49 and the grooves and tube are packed with bearing balls, not shown, and finally the blocks 41 are secured in position on the blocks 40. The diameter of the passages formed by the grooves 43—44 and the diameter of the bore of the tube are slightly greater than the diameter of the bearing balls to permit of the free flow of the balls along the guideway.

The track rods on the movable member 2, Figs. 1 and 2 or Fig. 4 may be tapered as described with reference to Fig. 3; and the track rods on the movable member 2, Fig. 4, may be untapered, if desired.

What I claim is:

1. An anti-clogging rectilinear ball-bearing assembly, comprising inner carrier means, two pairs of cylindrical track rods respectively mounted in substantially parallel relation on each of two opposite sides of said inner carrier means, outer carrier means including two outer carriers respectively disposed on opposite sides of said inner carrier means, a pair of cylindrical track rods on the inner side of each outer carrier and respectively facing said pairs of rods on said inner carrier means, each said pairs of rods being substantially horizontal with the rods of each pair disposed one above the other and with the outer pairs of rods substantially parallel to the respective inner pairs of rods to define substantially parallel trackways that are each longitudinally substantially horizontal and laterally substantially vertical, a plurality of balls in each of said trackways and constituting lateral supports between said inner and outer carrier means, the trackway forming portions of the lower rods of each pair being supported from the respective carrier means so that said portions are at least even with the side of such carrier means and the lower rods of the respective outer and inner pairs being spaced to define a dirt discharging slot at the bottom of each trackway, and continuous circulatory guideways disposed horizontally on one said carrier means and extending between the ends of the pairs of track rods on said one carrier means and cooperating with the trackways formed by said track rods to form endless runways for said balls, said balls forming an endless series in each said endless runways to continuously circulate upon relative movement between said carrier means, each of said guideways comprising two pairs of cylindrical rods having curved ends, said last mentioned pairs of rods being parallel with their curved ends substantially concentric to define dirt discharging slots at the bottom of said guideways.

2. A bearing assembly, as defined in claim 1, wherein said pairs of guideway rods are spaced slightly more than said track rods and the curved ends of the guideway rods are slightly eccentric to coincide respectively with the spacing of said track rods and said guideway rods, whereby to provide wider dirt discharging slots in said guideways and ensure free passage of the balls through the guideways.

3. A bearing assembly, as defined in claim 1, wherein said inner carrier means comprises three parallel bars of I section, means rigidly securing said bars in spaced parallel relation, means securing said track rods in the outer grooves of the sidemost bars, said guideway rods being secured to the inner grooves of the sidemost bars and in the respective grooves of the middle bar, said latter rods having curved ends disposed adjacent the track rods on said outer carrier means to provide the circulatory ball guideways.

4. An anti-clogging rectilinear ball-bearing assembly, comprising an inner carrier including three rigidly connected I bars, two pairs of cylindrical track rods respectively mounted in substantially parallel relation in the grooves in the outer sides of the two opposite side bars, two pairs of cylindrical guide rods respectively mounted in the grooves in the inner side of said side bars, said guide rods having curved end portions extending around the ends of said I bars and terminating in juxtaposition to the ends of said track rods, outer carrier means including two outer carriers respectively disposed on opposite sides of said inner carrier, a pair of cylindrical track rods on the inner side of each outer carrier and respectively facing said pairs of track rods on said inner carrier, two pairs of track guide rods respectively mounted in the grooves in the opposite side of the intermediate bar of said inner carrier, said latter guide rods respectively facing said first-mentioned guide rods and having curved end portions which are substantially concentric with the curved end portions of said first-mentioned guide rods, the curved end portions of said latter guide rods terminating in juxtaposition to said outer carrier track rods to form with said track rods and said guide rods two endless trackways, each said pairs of rods being substantially horizontal with the rods of each pair disposed one above the other and with the respective pairs of rods substantially parallel to define substantially parallel trackways that are each longitudinally substantially horizontal and laterally substantially vertical, a plurality of balls forming an endless series in each of said trackways and constituting lateral supports between said inner and outer carriers, the trackway forming portions of the lower rods of each pair being supported from the respective carrier so that said portions are at least even with the side of such carrier and the lower rods of the respective pairs being spaced to define a dirt discharging slot at the bottom of each trackway.

5. A bearing assembly, as defined in claim 4, wherein said guide rods are spaced a greater distance than said track rods to provide wider dirt discharging slots at the bottoms thereof, the curved end portions of the inner and outer guide rods being slightly eccentric to accommodate the difference in spacing between said guide rods and said track rods.

6. An anti-clogging rectilinear ball-bearing assembly, comprising inner carrier means, two pairs of cylindrical track rods respectively mounted in substantially parallel relation on each of two opposite sides of said inner carrier means, outer carrier means including two outer carriers respectively disposed on opposite sides of said inner carrier means, a pair of cylindrical track rods on the inner side of each outer carrier and respectively facing said pairs of rods on said inner carrier means, each of said pairs of rods being substantially horizontal with the rods of each pair disposed one above the other and with the outer pairs of rods substantially parallel to the respective inner pairs of rods to define substantially parallel trackways that are each longitudinally substantially horizontal and laterally substantially vertical, a plurality of balls in each of said trackways and constituting lateral supports between said inner and outer carrier means, the trackway forming portions of the lower rods of each pair being supported from the respective carrier means so that said portions are at least even with the side of such carrier means and the lower rods of the respective outer and inner pairs being spaced to define a dirt discharging slot at the bottom of each trackway, and continuous circulatory guideways disposed horizontally on one said carrier means and extending between the ends of the pairs of track rods on said one carrier means and cooperating with the trackways formed by said track rods to form endless runways for said balls, said balls forming an endless series in each said endless runways to continuously circulate upon relative movement between said carrier means, said guideways comprising superimposed elements each having substantially semi-circular guide surfaces juxtaposed to jointly form said endless runways.

7. A bearing assembly as defined in claim 6 wherein said guideway elements include inner and outer superimposed elements respectively having concentric upper and lower substantially semi-circular surfaces juxtaposed to jointly form said runways, said concentric surfaces being spaced to define dirt discharging slots therebetween.

8. A bearing assembly as defined in claim 7 wherein said substantially semi-circular concentric surfaces are of rounded section.

GEORGE McVEY.

References Cited in the file of this patent
UNITED STATES PATENTS

| Number | Name | Date |
|---|---|---|
| 1,381,188 | Gury | June 14, 1921 |
| 1,964,319 | Gorton et al. | June 26, 1934 |
| 2,264,302 | Devlin | Dec. 2, 1941 |
| 2,299,677 | Bickel | Oct. 20, 1942 |
| 2,343,575 | Penney | Mar. 7, 1944 |